O. A. WEISSENBORN.
MEANS FOR IDENTIFYING MOTOR OR OTHER VEHICLES IN CASE OF ACCIDENT.
APPLICATION FILED DEC. 27, 1912.
1,071,540.
Patented Aug. 26, 1913.
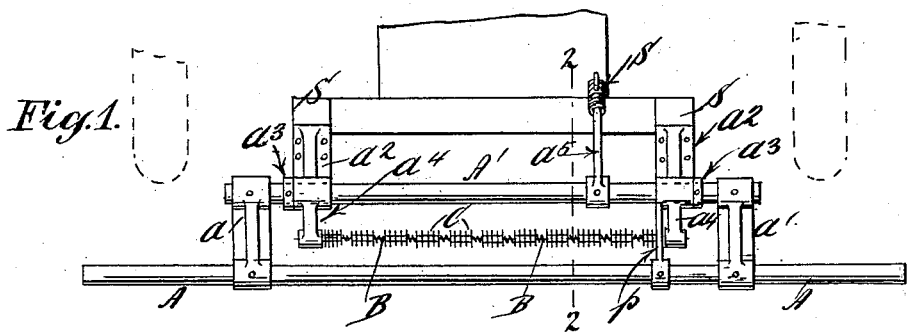
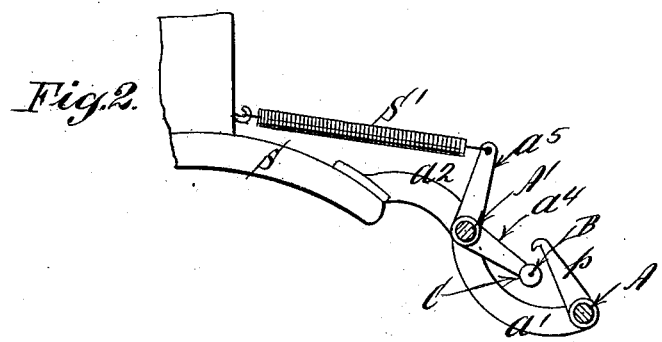
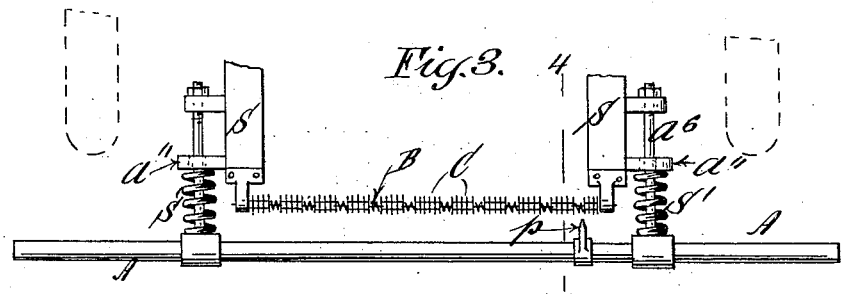
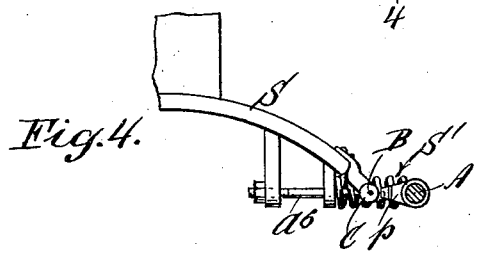
Witnesses:
G. C. Gardner,
H. Jones
Inventor:
Oscar A. Weissenborn
By his Attorney
David W. Gardner
COLUMBIA PLANOGRAPH CO., WASHINGTON, D. C.

UNITED STATES PATENT OFFICE.

OSCAR A. WEISSENBORN, OF JERSEY CITY, NEW JERSEY.

MEANS FOR IDENTIFYING MOTOR OR OTHER VEHICLES IN CASE OF ACCIDENT.

1,071,540.     Specification of Letters Patent.     Patented Aug. 26, 1913.

Application filed December 27, 1912. Serial No. 738,884.

*To all whom it may concern:*

Be it known that I, OSCAR A. WEISSENBORN, a citizen of the United States, residing in Jersey City, Hudson county, and State of New Jersey, have invented certain new and useful Improvements in Means for Identifying Motor or other Vehicles in Case of Accident, of which the following is a specification.

The object of my invention is to provide means whereby an automobile "running down" or injuring a person may be detected, and the invention consists in a buffer suitably mounted on the front of an automobile in conjunction with a plurality of identification checks mounted on a breakable support in proximity thereto, and in means for positively releasing a plurality of said identification checks.

In the accompanying drawings, I show means for carrying out practically my invention.

Figure 1, is a front elevation of parts essential for the carrying out of my invention, a buffer, identification checks and parts of an automobile being shown; Fig. 2, is a section on plane of line 2—2 Fig. 1; Fig. 3, is plan of a modification of the parts shown in Fig. 1; Fig. 4, a section on plane of line 3—3 Fig. 4.

In carrying out my present invention, reference may be had to my United States Letters Patent No. 1,037,092 dated August 27, 1912, in which I show and claim a fender composed of a plurality of identification checks mounted on a breakable support.

Describing Figs. 1 and 2, of my present invention, A, is a buffer extending the width of and covering the wheels in front of an automobile, suitably mounted in brackets $a'$, $a'$, which are rigidly attached to a cross bar $A'$, loosely supported in brackets $a^2$, $a^2$, secured to a stationary part of the automobile,—as for instance the springs $s$. In order to prevent lateral movement of the cross bar $A'$, it may in some cases be necessary to provide collars $a^3$, $a^3$, but this is not an essential part of my invention. Secured to and forming part of the brackets $a^2$, $a^2$, are arms $a^4$, $a^4$, extending forward and in proximity to the buffer A, between which are mounted a plurality of identification checks C, on a breakable support B. Attached to or forming part of the buffer A, is a projection $p$, which when the buffer A, comes in contact with any object insures the positive breaking of the support B, a tension spring or springs $S'$, attached to a stationary part of the automobile and to an arm $a^5$, on the cross bar $A'$, preserving the parts in their proper relation to each other under normal conditions. Thus it will be seen that by the rocking of the buffer A, downward, the projection $p$, will come in contact with the disk support B, causing the latter to break and release the identification checks C. In referring to the breakable support B, in this connection I include a wire or other suitable support which will part under an ordinary strain or tension.

In Figs. 3 and 4, I show means for carrying out my invention by using a buffer A, supported in suitable brackets $a''$, $a''$, between which springs $S'$, $S'$, are supported on the rods $a^6$, $a^6$, interposed between said brackets $a''$, and the buffer A. Supported between stationary parts of the automobile are a plurality of identification checks C, on the breakable support B. To insure the release of the identification checks C, when the buffer comes in contact with an object such as a human being, I provide the buffer with an arm or projection $p$, which may consist of a knife-edge or otherwise if found desirable, although this is not essential in carrying out my invention.

What I claim as my invention and desire to secure by Letters Patent is,

1. A buffer for automobiles, a plurality of identification checks in proximity thereto mounted on a breakable support and means connected with said buffer for positively breaking said support for releasing said identification checks when the buffer comes in contact with an object, such as a human being for the purpose described.

2. A buffer for automobiles, a plurality of identification checks in proximity thereto mounted on a breakable support, and a device for severing said support when the buffer comes in contact with an object, such as a human being, for the purpose described.

OSCAR A. WEISSENBORN.

Witnesses:
RUDOLPH C. E. MAY,
D. W. GARDNER.

Copies of this patent may be obtained for five cents each, by addressing the "Commissioner of Patents, Washington, D. C."